Aug. 17, 1943.     R. SMITH, JR     2,327,073
SOLDERING IRON HOLDER AND CIRCUIT CONTROL
Filed May 12, 1942
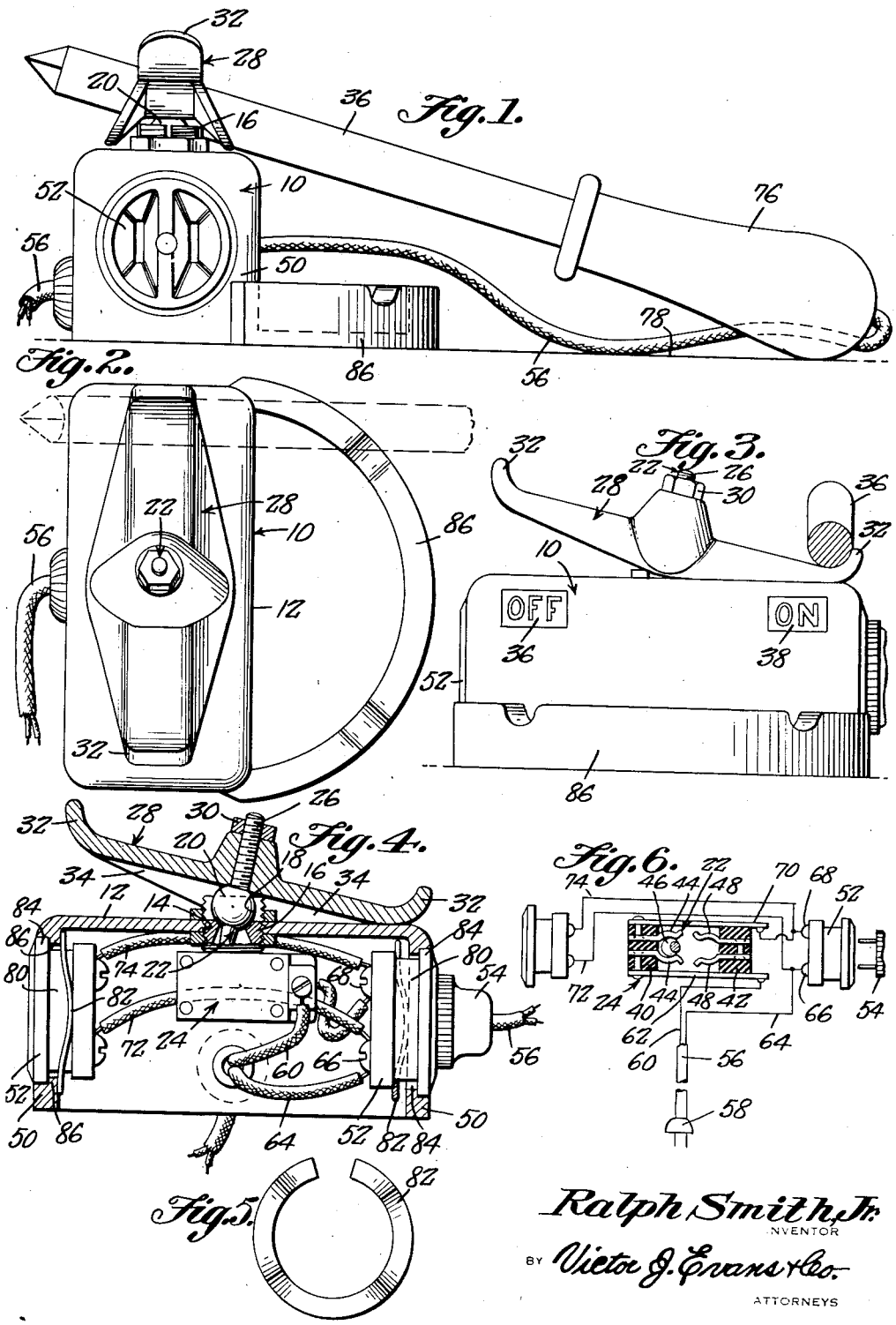
Ralph Smith, Jr.
INVENTOR
BY Victor J. Evans & Co.
ATTORNEYS Patented Aug. 17, 1943

2,327,073

UNITED STATES PATENT OFFICE 2,327,073

SOLDERING IRON HOLDER AND CIRCUIT CONTROL

Ralph Smith, Jr., Trail, British Columbia, Canada

Application May 12, 1942, Serial No. 442,704

2 Claims. (Cl. 219—23)

My invention relates to soldering irons, and has among its objects and advantages the provision of an improved combination soldering iron holder and current control.

In the accompanying drawing:

Figure 1 is an end view illustrating a soldering iron supported on the holder;

Figure 2 is a top plan view;

Figure 3 is a front face view;

Figure 4 is a longitudinal sectional view;

Figure 5 is a plan view of a socket retaining washer; and

Figure 6 is a diagrammatic view of the electric circuit.

In the embodiment selected for illustration, I make use of a metal housing 10 in the top wall 12 of which is provided a threaded opening 14 for the reception of a body 16 having a socket 18 supporting a pivot ball 20 on a switch arm 22. The switch 24 is secured to the body 16 inside the housing 10, and the ball pivot 20 is located intermediate the ends of the switch arm 22. The outer end of the switch arm is threaded at 26 for connection with a soldering iron rest 28. The arm is threaded into engagement with the pivot ball 20 and is secured against accidental unloosening by a nut 30 threaded on the switch arm. Each end of the rest 28 has an upturned end 32, and the rest is provided with depending reinforcing flanges 34. These flanges are angled so that the rest 28 may pivot to a switch closing position when moved to the position of Figures 3 and 4 or to a switch opening position when pivoted to bring the other end of the rest into engagement with the top wall 12. The rest is pivoted through the medium of the soldering iron 36. In either position of the rest 28, the upturned end 32 at the low end of the rest provides an abutment to hold the soldering iron on the rest. The off and on positions of the rest 28 are indicated by appropriate markings, as at 36 and 38, respectively, in Figure 3.

In Figure 6, the switch 24 includes two insulative bodies 40 and 42. The body 40 is provided with two spring contacts 44 between which a ball 46 at the lower end of the switch arm 22 may be pressed to close the circuit through the soldering iron 36. The body 42 is also provided with two spring fingers 48 for yieldingly securing the ball 46 in the off position of the rest 28.

To the end walls 50 of the housing 10 are secured sockets 52 for connection with a plug 54 electrically connected with the cord 56 of the soldering iron. This plug may be connected with either socket 52. The current supply cord 56 includes the usual plug 58 for connection with the usual wall socket, and the wire 60 of the cord is electrically connected with a conductor 62 electrically connected with one of the fingers 44 and the second wire 64 is electrically connected with a terminal 66 of one of the sockets 52. The other terminal 68 of this socket is electrically connected with a conductor 70 electrically connected with the other finger 44. Wires 72 and 74 respectively connect the terminals of the other socket 52 with the terminals 66 and 68.

In operation, the switch 24 is opened and closed through manipulation of the rest 28. The rest supports the soldering iron 36 in an inclined position, with the handle 76 of the soldering iron resting on the bench surface 78 on which the housing 10 is placed. In either position of the rest 28, the lower end of the rest engages the top wall 12 to support the load of the soldering iron and thereby relieve the switch structure from carrying the entire load. The rest 28 is easily manipulated at will by pressing the soldering iron down on the high end.

The sockets 52 are provided with circumferential grooves 80 for the reception of split spring washers 82 engaging one wall of its respective groove 80 and one of the end walls 50. The flanges 84 on the sockets 52 are pressed firmly against ledges 86 formed on the end walls 50 so as to be held in firm connection with the end walls. These end walls are open at 84 so that the sockets 52 may extend inside the housing 10 and with their outer faces substantially flush with the end walls 50.

An ash tray 86 is cast integrally with the housing 10 for the convenience of the operator. In lieu of functioning for ash tray purposes, the tray 86 may also be used as a receptacle for small parts and supplies necessary for a given job.

Without further elaboration, the foregoing will so fully illustrate my invention, that others may, by applying current knowledge, readily adapt the same for use under various conditions of service.

I claim:

1. In a device of the type described, the combination of a support, an electric soldering iron circuit having a switch mounted on the support, a soldering iron rest movably mounted on said support and having first and second arms adapted to selectively support the soldering iron, an operating connection between said rest and said switch to close the switch when the rest is moved in one direction by placing the soldering iron on said first arm and to open the switch when the soldering iron is placed on the second arm, said rest being pivotally mounted on said support with said first and second arms respectively engaging the support in their switch closing and opening positions, said arms having upturned ends constituting abutments for the soldering iron, and markings on said support coacting with said arms to indicate their respective switch closing and opening positions.

2. A device of the type described comprising a support, an electric soldering iron switch mounted on the support, a soldering iron rest having a pivotal connection with said support, said rest including two arms projecting in opposite directions from said pivotal connection, an operating connection between said rest and said switch to close the switch when the rest is pivoted in one direction by placing the soldering iron on one of said arms and to open the switch when the soldering iron is placed on the other arm, said arms including abutments at their ends for holding the soldering iron on the arms, and said arms in their respective switch closing and opening positions having engagement with said support, said arms being located at such height as to support one end of the soldering iron when the other end is rested on a surface on which said first mentioned support is rested.

RALPH SMITH, JNR.